United States Patent
Chang (10) Patent No.: US 8,733,942 B2
(45) Date of Patent: May 27, 2014

(54) ILLUMINATION SYSTEM AND PROJECTOR USING THE SAME

(75) Inventor: Keh-Su Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 276 days.

(21) Appl. No.: 13/204,864

(22) Filed: Aug. 8, 2011

(65) Prior Publication Data

US 2012/0033185 A1 Feb. 9, 2012

Related U.S. Application Data

(60) Provisional application No. 61/371,877, filed on Aug. 9, 2010.

(51) Int. Cl.
*G03B 21/14* (2006.01)
*F21V 9/00* (2006.01)

(52) U.S. Cl.
USPC .............................. 353/31; 353/94; 362/231

(58) Field of Classification Search
USPC ........ 353/31, 33, 34, 37, 85, 84, 94; 349/5, 7, 349/8, 9; 362/234, 231; 348/742, 743, 771
See application file for complete search history.

(56) References Cited

U.S. PATENT DOCUMENTS

| | | | |
|---|---|---|---|
| 6,212,213 B1 * | 4/2001 | Weber et al. ................. | 372/50.1 |
| 7,070,300 B2 | 7/2006 | Harbers et al. | |
| 7,568,805 B2 * | 8/2009 | Lee et al. ........................ | 353/33 |
| 8,021,001 B2 * | 9/2011 | Iwanaga ........................... | 353/85 |
| 8,308,306 B2 * | 11/2012 | Miyazaki et al. ................ | 353/84 |
| 8,506,091 B2 * | 8/2013 | Wang et al. ...................... | 353/84 |
| 2003/0067773 A1 | 4/2003 | Marshall et al. | |
| 2008/0143973 A1 * | 6/2008 | Wu .................. | 353/33 |
| 2010/0045938 A1 * | 2/2010 | Lin et al. ......................... | 353/33 |
| 2010/0238412 A1 * | 9/2010 | Kurosaki ......................... | 353/31 |
| 2010/0290208 A1 * | 11/2010 | Pickard ............................ | 362/84 |
| 2011/0242791 A1 * | 10/2011 | Chen et al. ...................... | 362/84 |

FOREIGN PATENT DOCUMENTS

| | | |
|---|---|---|
| CN | 101027520 | 8/2007 |
| JP | 2000223745 | 8/2000 |
| JP | 2006338901 | 12/2006 |
| WO | 2009017992 | 2/2009 |
| WO | 2009069010 | 6/2009 |

* cited by examiner

*Primary Examiner* — William C Dowling
(74) *Attorney, Agent, or Firm* — Kirton McConkie; Evan R. Witt (57) ABSTRACT

An illumination system includes a first solid-state light-emitting element, a wavelength conversion device, a second solid-state light-emitting element and a third solid-state light-emitting element. The first solid-state light-emitting element is used for emitting a first color light in a first waveband region. The wavelength conversion device includes a wheel body and a wavelength conversion section. The wheel body includes a rotation shaft. The wavelength conversion section surrounds the rotation shaft and contains phosphor coating. By the phosphor coating, the first color light from the first solid-state light-emitting element is excited as a second color light in a second waveband region to be outputted. The second solid-state light-emitting element is used for emitting first color light. The third solid-state light-emitting element is used for emitting a third color light in a third waveband region.

24 Claims, 9 Drawing Sheets

ILLUMINATION SYSTEM AND PROJECTOR USING THE SAME

CROSS-REFERENCE TO RELATED APPLICATION

This application claims the benefit of U.S. Provisional Application No. 61/371,877 filed on Aug. 9, 2010, and entitled "SOLID STATE ILLUMINATOR", the entirety of which is hereby incorporated by reference.

FIELD OF THE INVENTION

The present invention relates to an illumination system, and more particularly to an illumination system with solid-state light-emitting elements. The present invention also relates to a projector using the illumination system.

BACKGROUND OF THE INVENTION

In recent years, a variety of projectors have been widely used in various video applications. By the projector, an image signal provided by an image signal source is enlarged and shown on a projection screen. For reducing power consumption and longer life, the illumination system of the current projector employs a solid-state light-emitting element (e.g. light emitting diode or laser diode) to replace the conventional high intensity discharge (HID) lamp.

Generally, the illumination system of the projector should emit three primary colors of light, i.e. red light (R), green light (G) and blue light (B). As for the luminous efficiency of the solid-state light-emitting element, the luminous efficiency of the blue solid-state light-emitting element>the luminous efficiency of the red solid-state light-emitting element>>the luminous efficiency of the green solid-state light-emitting element. Since the green solid-state light-emitting element has poor luminous efficiency, the green light is produced by using a blue solid-state light-emitting element and a plate containing phosphor or wavelength conversion material. That is, the uses of the blue solid-state light-emitting element and the plate may directly emit the green light in replace of the green blue solid-state light-emitting element. Consequently, the luminous efficiency of the whole illumination system is enhanced.

However, since the phosphor or the wavelength conversion material contained in the plate of the conventional illumination system is readily affected by temperature, a thermal quenching problem possibly occurs. Due to the thermal quenching problem, the luminous efficiency of the converted and outputted green light is largely decreased as the temperature is increased.

Figure 1A:
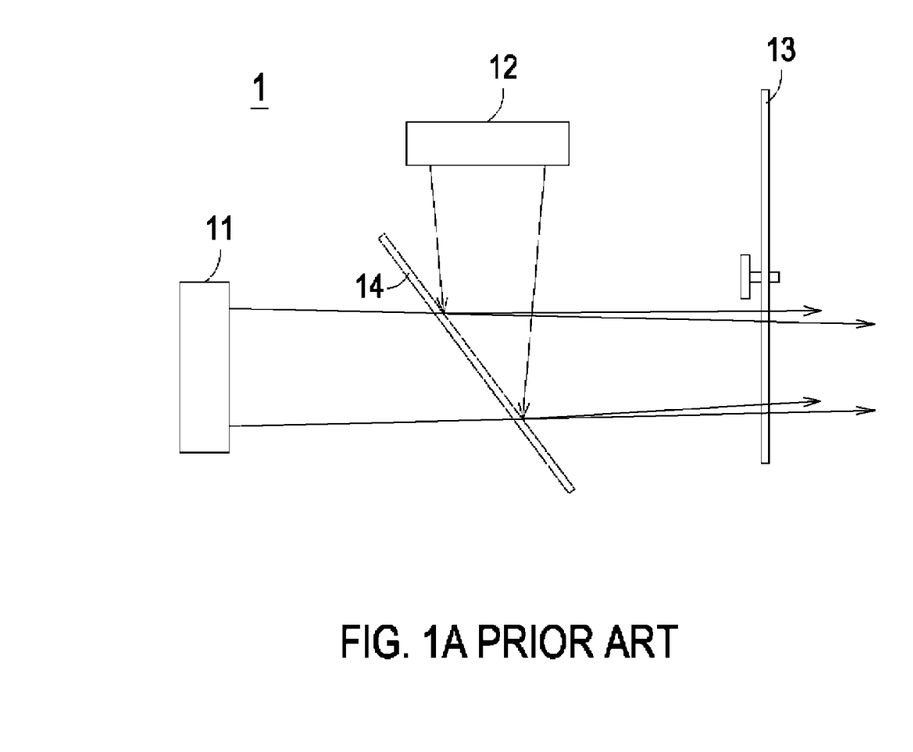
FIG. 1A schematically illustrates the architecture of a conventional illumination system.
Figure 1B:
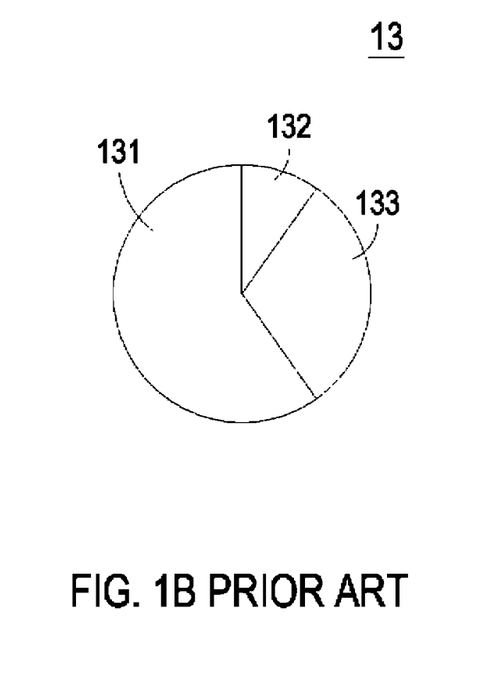
FIG. 1B schematically illustrates the configuration of a phosphor wheel used in the conventional illumination system as shown in FIG. 1A.

FIG. 1A schematically illustrates the architecture of a conventional illumination system. FIG. 1B schematically illustrates the configuration of a phosphor wheel used in the conventional illumination system as shown in FIG. 1A. The conventional illumination system 1 comprises a blue LED 11, a red LED 12, a phosphor wheel 13 and a dichroic minor 14. The dichroic minor 14 is located between the blue LED 11 and the phosphor wheel 13. The blue LED 11 is used for emitting blue light. The blue light is transmitted through the dichroic minor 14 and directed to an optical path. The red LED 12 is used for emitting red light. The red light is reflected by the dichroic minor 14 and directed to the optical path. The rotation of the phosphor wheel 13 is driven by a motor (not shown). The phosphor wheel 13 comprises a first section 131, a second section 132 and a third section 133. The first section 131 contains phosphor or wavelength conversion material. By the phosphor or wavelength conversion material, the blue light emitted by the blue LED 11 is excited as green light to be outputted. The second section 132 and the third section 133 fail to contain phosphor or wavelength conversion material and are transparent sections. For example, the second section 132 and the third section 133 are respectively a blue color filter and a red color filter. Consequently, the blue light and the red light are transmissible through the second section 132 and the third section 133, respectively.

In a first time segment, the blue LED 11 is enabled, the red LED 12 is disabled, and the phosphor wheel 13 is driven to rotate by the motor such that the first section 131 is located in the optical path. The blue light emitted by the blue LED 11 is excited as green light by the phosphor or wavelength conversion material, and thus the green light is outputted in the first time segment. Next, in a second time segment, the blue LED 11 is also enabled, the red LED 12 is also disabled, and the phosphor wheel 13 is driven to rotate by the motor such that the second section 132 is located in the optical path. The blue light emitted by the blue LED 11 is transmitted through the second section 132 of the phosphor wheel 13, and thus the blue light is outputted in the second time segment. Next, in a third time segment, the blue LED 11 is disabled, the red LED 12 is enabled, and the phosphor wheel 13 is driven to rotate by the motor such that the third section 133 is located in the optical path. The red light emitted by the red LED 12 is transmitted through the third section 133 of the phosphor wheel 13, and thus the red light is outputted in the third time segment.

However, the conventional illumination system 1 is suffered from a wheel rotational unbalance problem, and different colors of light fail to be mixed at the same time spot. That is, the conventional illumination system 1 can not be operated in the BrightSync mode, and thus the brightness is usually unsatisfied.

Figure 2A:
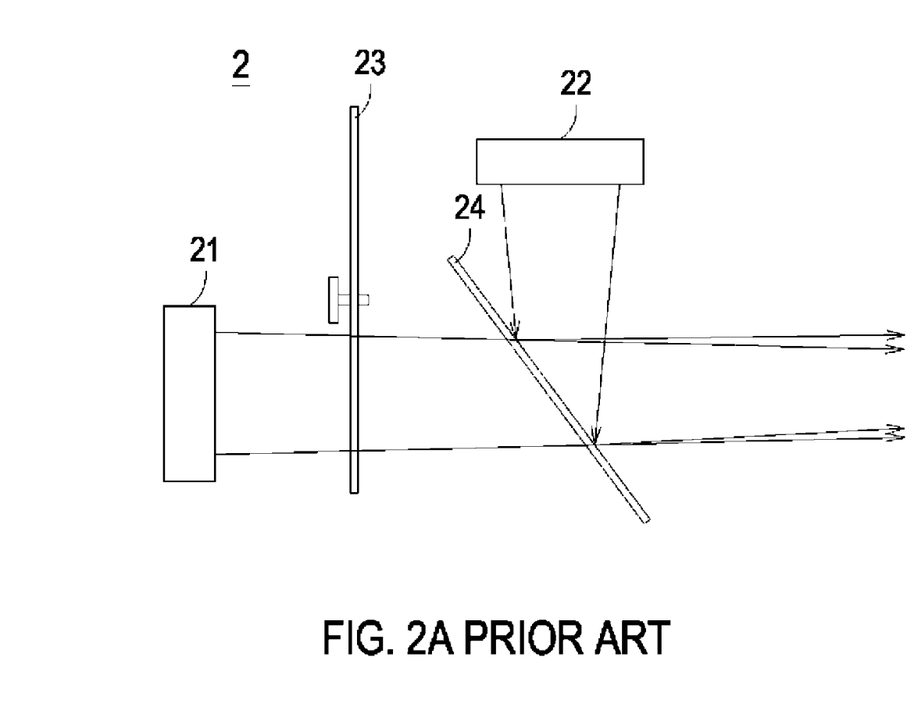
FIG. 2A schematically illustrates the architecture of another conventional illumination system.
Figure 2B:
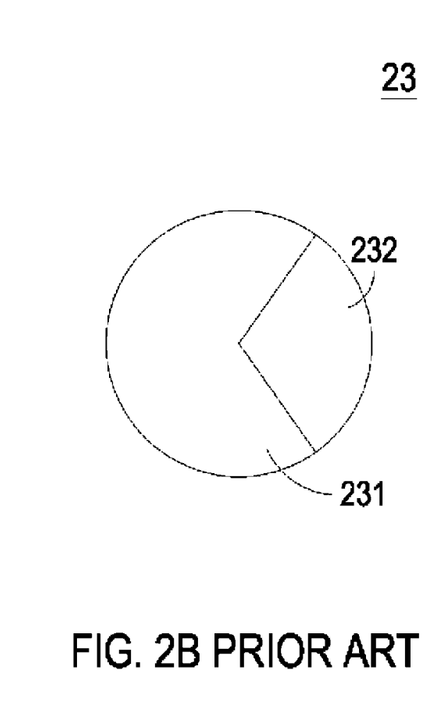
FIG. 2B schematically illustrates the configuration of a phosphor wheel used in the conventional illumination system as shown in FIG. 2A.

FIG. 2A schematically illustrates the architecture of another conventional illumination system. FIG. 2B schematically illustrates the configuration of a phosphor wheel used in the conventional illumination system as shown in FIG. 2A. The conventional illumination system 2 comprises a blue LED 21, a red LED 22, a phosphor wheel 23 and a dichroic minor 24. The phosphor wheel 23 is located between the blue LED 21 and the dichroic mirror 24. The blue LED 21 is used for emitting blue light and directing the blue light to an optical path. In different time sequences, the blue light is transmitted through different time segments of the phosphor wheel 23, so that the blue light is outputted or the blue light is excited as green light to be outputted. The blue light or the green light outputted from the phosphor wheel 23 is then transmitted through the dichroic mirror 24. The red LED 22 is used for emitting red light. The red light is reflected by the dichroic mirror 24 and directed to the optical path. The rotation of the phosphor wheel 23 is driven by a motor (not shown). The phosphor wheel 23 comprises a first section 231 and a second section 232. The first section 231 contains phosphor or wavelength conversion material. By the phosphor or wavelength conversion material, the blue light emitted by the blue LED 21 is excited as green light to be outputted. The second section 232 fails to contain phosphor or wavelength conversion material and is a transparent section. For example, the second section 132 is a blue color filter. Consequently, the blue light is transmissible through the second section 232.

In a first time segment, the blue LED 21 is enabled, the red LED 22 is disabled, and the phosphor wheel 23 is driven to rotate by the motor such that the first section 231 is located in the optical path. The blue light emitted by the blue LED 21 is excited as green light by the phosphor or wavelength conversion material, and thus the green light is outputted in the first time segment. Next, in a second time segment, the blue LED 21 is also enabled, the red LED 22 is also disabled, and the phosphor wheel 23 is driven to rotate by the motor such that the second section 232 is located in the optical path. The blue light emitted by the blue LED 21 is transmitted through the second section 232 of the phosphor wheel 23, and thus the blue light is outputted in the second time segment. Next, in a third time segment, the blue LED 21 is disabled, the red LED 22 is enabled, and the phosphor wheel 23 is disabled. The red light from the red LED 22 is reflected by the dichroic mirror 24 and directed to the optical path.

However, the conventional illumination system 2 is also suffered from the wheel rotational unbalance problem. In addition, it is difficult to design the dichroic mirror 24, and the brightness of the green light is impaired.

Figure 3A:
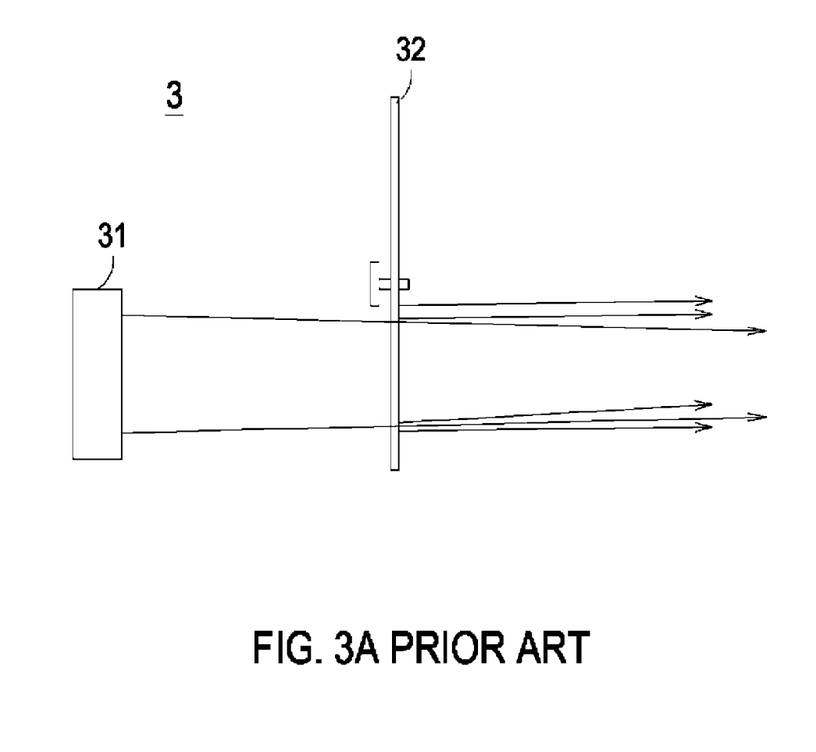
FIG. 3A schematically illustrates the architecture of another conventional illumination system.
Figure 3B:
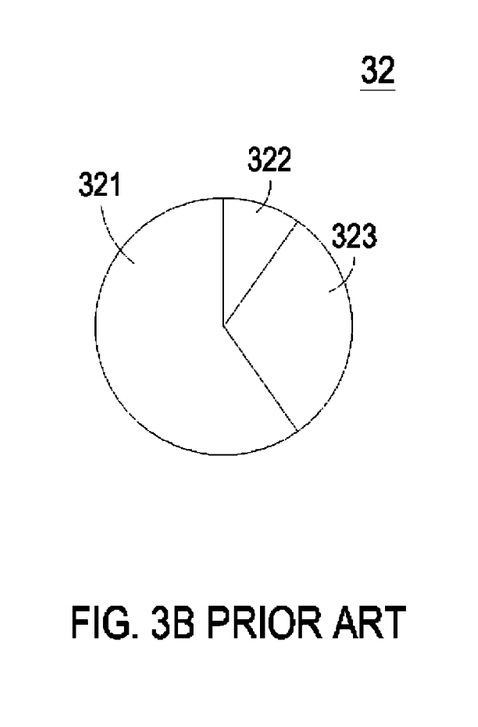
FIG. 3B schematically illustrates the configuration of a phosphor wheel used in the conventional illumination system as shown in FIG. 3A.

FIG. 3A schematically illustrates the architecture of another conventional illumination system. FIG. 3B schematically illustrates the configuration of a phosphor wheel used in the conventional illumination system as shown in FIG. 3A. The conventional illumination system 3 comprises a blue LED 31 and a phosphor wheel 32. The blue LED 31 is used for emitting blue light and directing the blue light to an optical path. The rotation of the phosphor wheel 33 is driven by a motor (not shown). The phosphor wheel 32 comprises a first section 321, a second section 322 and a third section 323. The first section 321 contains first phosphor or first wavelength conversion material. By the first phosphor or first wavelength conversion material, the blue light emitted by the blue LED 31 is excited as green light to be outputted. The second section 322 fails to contain phosphor or wavelength conversion material and is a transparent section. For example, the second section 132 is a blue color filter. Consequently, the blue light is transmissible through the second section 322. The third section 323 contains second phosphor or second wavelength conversion material. By the second phosphor or second wavelength conversion material, the blue light emitted by the blue LED 31 is excited as red light to be outputted.

In a first time segment, the blue LED 31 is enabled, and the phosphor wheel 32 is driven to rotate by the motor such that the first section 321 is located in the optical path. The blue light emitted by the blue LED 31 is excited as green light by the first phosphor or first wavelength conversion material, and thus the green light is outputted in the first time segment. Next, in a second time segment, the blue LED 31 is also enabled, and the phosphor wheel 32 is driven to rotate by the motor such that the second section 322 is located in the optical path. The blue light emitted by the blue LED 31 is transmitted through the second section 322 of the phosphor wheel 32, and thus the blue light is outputted in the second time segment. Next, in a third time segment, the blue LED 31 is also enabled, and the phosphor wheel 32 is driven to rotate by the motor such that the third section 323 is located in the optical path. The blue light emitted by the blue LED 31 is excited as red light by the second phosphor or second wavelength conversion material, and thus the red light is outputted in the first time segment.

Although the conventional illumination system 3 is relatively power-saving, the wheel rotational unbalance problem fails to be effectively solved. Moreover, since different colors of light fail to be mixed at the same time spot, the conventional illumination system 3 can not be operated in the BrightSync mode. Under this circumstance, the brightness is usually unsatisfied.

SUMMARY OF THE INVENTION

The present invention provides an illumination system with a solid-state light-emitting element, in which the wheel rotational unbalance problem can be avoided. Since different colors of light may be mixed at the same time spot, the illumination system can be operated in the BrightSync mode. In addition, the overall luminous efficiency and brightness of the illumination system will be enhanced.

The present invention also provides a projector using the illumination system.

In accordance with an aspect of the present invention, there is provided an illumination system. The illumination system includes a first solid-state light-emitting element, a wavelength conversion device, a second solid-state light-emitting element and a third solid-state light-emitting element. The first solid-state light-emitting element is used for emitting a first color light in a first waveband region. The wavelength conversion device comprises a wheel body and a wavelength conversion section, wherein the wheel body comprises a rotation shaft, and the wavelength conversion section surrounds the rotation shaft and contains a phosphor coating, wherein by the phosphor coating, the first color light from the first solid-state light-emitting element is excited as a second color light in a second waveband region to be outputted. The second solid-state light-emitting element is used for emitting the first color light. The third solid-state light-emitting element is used for emitting a third color light in a third waveband region.

In accordance with another aspect of the present invention, there is provided an illumination system. The illumination system includes a first solid-state light-emitting element, a first wavelength conversion device, a second solid-state light-emitting element, a third solid-state light-emitting element and a second wavelength conversion device. The first solid-state light-emitting element is used for emitting a first color light in a first waveband region. The first wavelength conversion device comprises a first wheel body and a first wavelength conversion section, wherein the first wheel body comprises a first rotation shaft, and the first wavelength conversion section surrounds the first rotation shaft and contains a first phosphor coating, wherein by the first phosphor coating, the first color light from the first solid-state light-emitting element is excited as a second color light in a second waveband region to be outputted. The second solid-state light-emitting element is used for emitting the first color light. The third solid-state light-emitting element is used for emitting the first color light. The second wavelength conversion device comprises a second wheel body and a second wavelength conversion section, wherein the second wheel body comprises a second rotation shaft, and the second wavelength conversion section surrounds the second rotation shaft and contains a second phosphor coating, wherein by the second phosphor coating, the first color light from the third solid-state light-emitting element is excited as a third color light in a third waveband region to be outputted.

In accordance with a further aspect of the present invention, there is provided a projector. The projector includes an illumination system and an imaging system. The illumination system includes a first solid-state light-emitting element, a wavelength conversion device, a second solid-state light-emitting element and a third solid-state light-emitting element. The first solid-state light-emitting element is used for emitting a first color light in a first waveband region. The wavelength conversion device comprises a wheel body and a wavelength conversion section, wherein the wheel body comprises a rotation shaft, and the wavelength conversion section surrounds the rotation shaft and contains a phosphor coating, wherein by the phosphor coating, the first color light from the first solid-state light-emitting element is excited as a second color light in a second waveband region to be outputted. The second solid-state light-emitting element is used for emitting the first color light. The third solid-state light-emitting element is used for emitting a third color light in a third waveband region. The first color light, the second color light and the third color light from the illumination system are converted into an image ray by the imaging system.

In accordance with a still aspect of the present invention, there is provided a projector. The projector includes an illumination system and an imaging system. The illumination system includes a first solid-state light-emitting element, a first wavelength conversion device, a second solid-state light-emitting element, a third solid-state light-emitting element and a second wavelength conversion device. The first solid-state light-emitting element is used for emitting a first color light in a first waveband region. The first wavelength conversion device comprises a first wheel body and a first wavelength conversion section, wherein the first wheel body comprises a first rotation shaft, and the first wavelength conversion section surrounds the first rotation shaft and contains a first phosphor coating, wherein by the first phosphor coating, the first color light from the first solid-state light-emitting element is excited as a second color light in a second waveband region to be outputted. The second solid-state light-emitting element is used for emitting the first color light. The third solid-state light-emitting element is used for emitting the first color light. The second wavelength conversion device comprises a second wheel body and a second wavelength conversion section, wherein the second wheel body comprises a second rotation shaft, and the second wavelength conversion section surrounds the second rotation shaft and contains a second phosphor coating, wherein by the second phosphor coating, the first color light from the third solid-state light-emitting element is excited as a third color light in a third waveband region to be outputted. The first color light, the second color light and the third color light from the illumination system are converted into an image ray by the imaging system.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 4A:
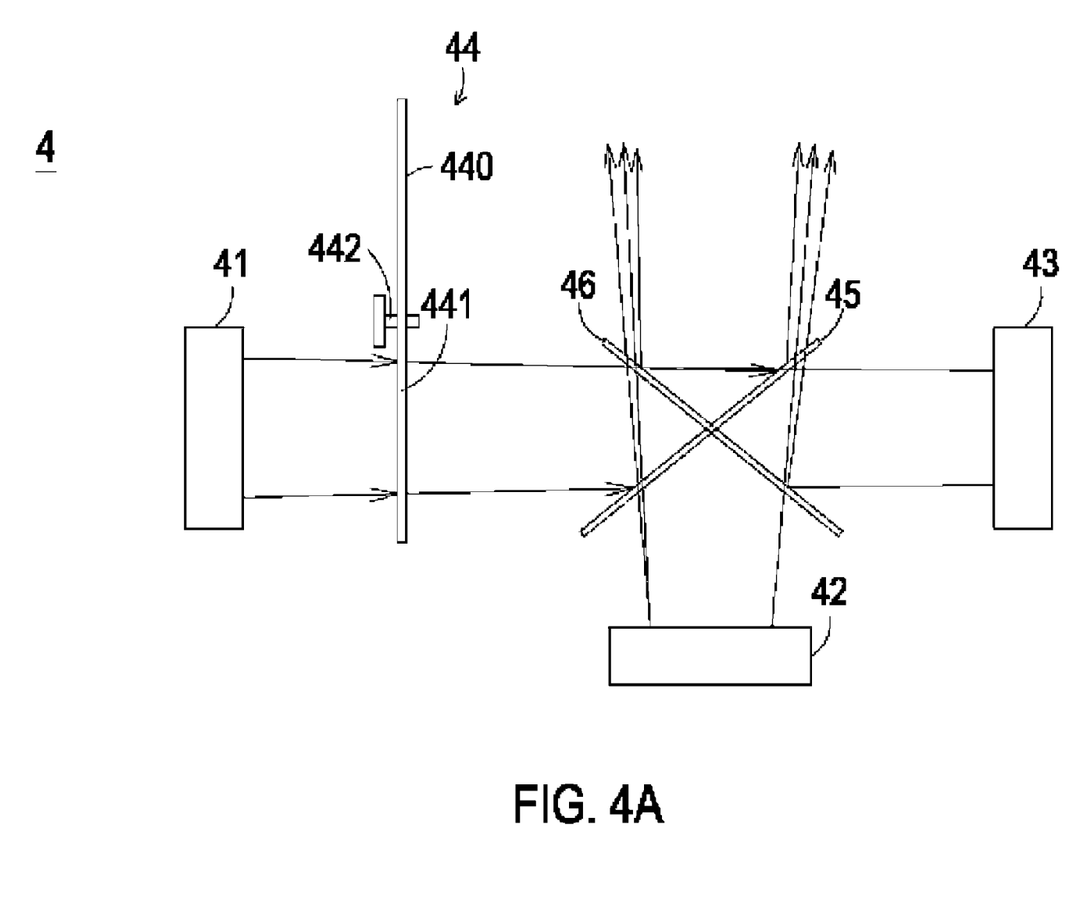
FIG. 4A schematically illustrates the architecture of an illumination system according to an embodiment of the present invention.
Figure 4B:
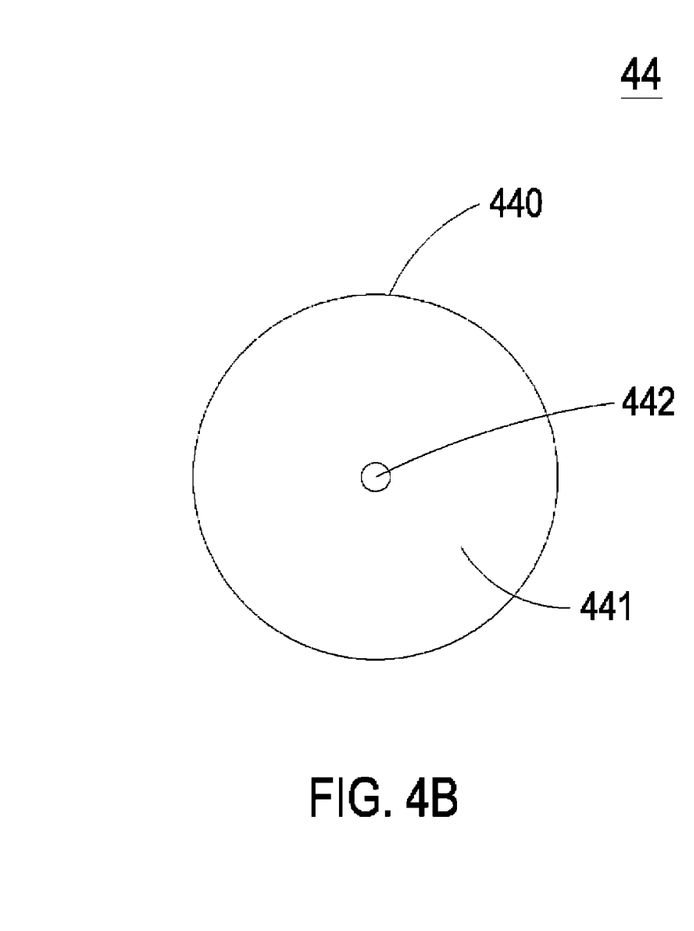
FIGS. 4B and 4C schematically illustrate the configuration of a wavelength conversion device used in the illumination system as shown in FIG. 4A.
Figure 4C:
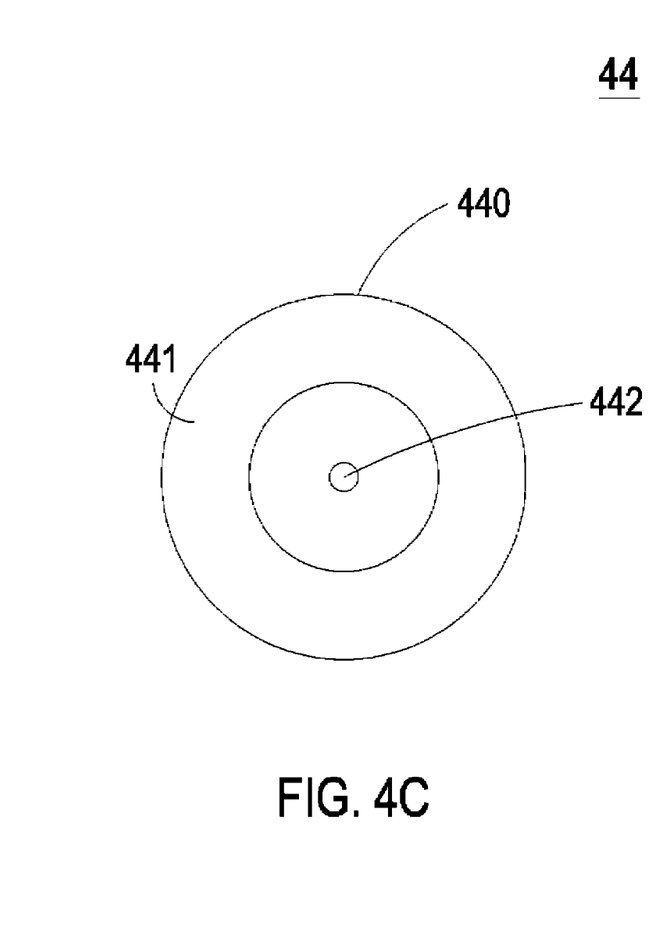

FIG. 4A schematically illustrates the architecture of an illumination system according to an embodiment of the present invention. FIGS. 4B and 4C schematically illustrate the configuration of a wavelength conversion device used in the illumination system as shown in FIG. 4A. The illumination system 4 comprises a first solid-state light-emitting element 41, a second solid-state light-emitting element 42, a third solid-state light-emitting element 43, a wavelength conversion device 44, a first dichroic mirror 45 and a second dichroic mirror 46. The first solid-state light-emitting element 41, the second solid-state light-emitting element 42 and the third solid-state light-emitting element 43 are light emitting diodes or laser diodes, and preferably light emitting diodes. The first solid-state light-emitting element 41 is configured to emit a first color light in a first waveband region. Preferably, the first color light in the first waveband region is blue light. The second solid-state light-emitting element 42 is configured to emit the first color light. The third solid-state light-emitting element 43 is configured to emit a third color light in a third waveband region. Preferably, the third color light in the third waveband region is red light. The wavelength conversion device 44 is a phosphor wheel and located between the first solid-state light-emitting element 41 and the first dichroic mirror 45. The wavelength conversion device 44 includes a wheel body 440 and a wavelength conversion section 441. The wheel body 40 includes a rotation shaft 442. The wavelength conversion section 441 surrounds the rotation shaft 442 and contains phosphor coating. By the phosphor coating, the first color light from the first solid-state light-emitting element 41 is excited as a second color light in a second waveband region to be outputted. Preferably, the second color light in the second waveband region is green light. In an embodiment, the wavelength conversion section 441 is the entity of the wheel body 440 (see FIG. 4B). Alternatively, the wavelength conversion section 441 is an annular region surrounding the rotation shaft 442 (see FIG. 4C). The rotation of the wavelength conversion device 44 is driven by a motor (not shown) so that the wavelength conversion device 44 can be driven to rotate around the rotation shaft 442. Moreover, the wavelength conversion section 441 is disposed at an optical path of the first color light emitted from the first solid-state light-emitting element 41.

In this embodiment, the first dichroic mirror 45 and the second dichroic mirror 46 are located between the first solid-state light-emitting element 41, the second solid-state light-emitting element 42 and the third solid-state light-emitting element 43. The blue light and the red light are transmissible through the first dichroic mirror 45, but the green light is permitted to be reflected by the first dichroic minor 45 and directed to the optical path. The green light and the blue light are transmissible through the second dichroic mirror 46, but the red light is permitted to be reflected by the second dichroic mirror 46 and directed to the optical path.

The first solid-state light-emitting element 41 is used for emitting blue light and directing the blue light to the wavelength conversion section 441 of the wavelength conversion device 44. By the phosphor coating contained in the wavelength conversion section 441 of the wavelength conversion device 44, the blue light is excited as green light to be outputted. The green light is then directed to the first dichroic mirror 45 and the second dichroic mirror 46. Moreover, the green light is transmitted through the second dichroic mirror 46, and then reflected by the first dichroic mirror 45 and directed to the optical path. The second solid-state light-emitting element 42 is used for emitting blue light. The blue light from the second solid-state light-emitting element 42 is then directed to the first dichroic mirror 45 and the second dichroic mirror 46. Moreover, the blue light is transmitted through the first dichroic mirror 45 and the second dichroic mirror 46 and directed to the optical path. The third solid-state light-emitting element 43 is used for emitting red light. The red light from the third solid-state light-emitting element 43 is then directed to the first dichroic mirror 45 and the second dichroic mirror 46. Moreover, the red light is transmitted through the first dichroic mirror 45, and then reflected by the second dichroic mirror 46 and directed to the optical path.

In any time segment, the first solid-state light-emitting element 41, the second solid-state light-emitting element 42 and the third solid-state light-emitting element 43 are simultaneously enabled. The wavelength conversion device 44 is driven to rotate by the motor. Since the wavelength conversion device 44 has the single wavelength conversion section 441 for generating the green light, the wavelength conversion device 44 is only able to excite the received blue light into the green light without outputting any other color of light. In other words, the green light can be generated and outputted in full time segment. The combination of the first solid-state light-emitting element 41 and the wavelength conversion device 44, the second solid-state light-emitting element 42 and the third solid-state light-emitting element 43 can simultaneously and respectively output the green light, the blue light and the red light in full time segment. Since different colors of light may be mixed at the same time spot, the illumination system can be operated in the BrightSync mode. In addition, overall luminous efficiency and brightness of the illumination system and the projector will be enhanced. Moreover, since the wavelength conversion section 441 of the wavelength conversion device 44 is the entity of the wheel body or an annular region surrounding the rotation shaft, the wheel rotational unbalance problem will be avoided. In addition, the rotation of the wavelength conversion device 44 can reduce the influence of temperature and consequently remove thermal quenching problem and increase the luminous efficiency of the illumination system.

Figure 5A:
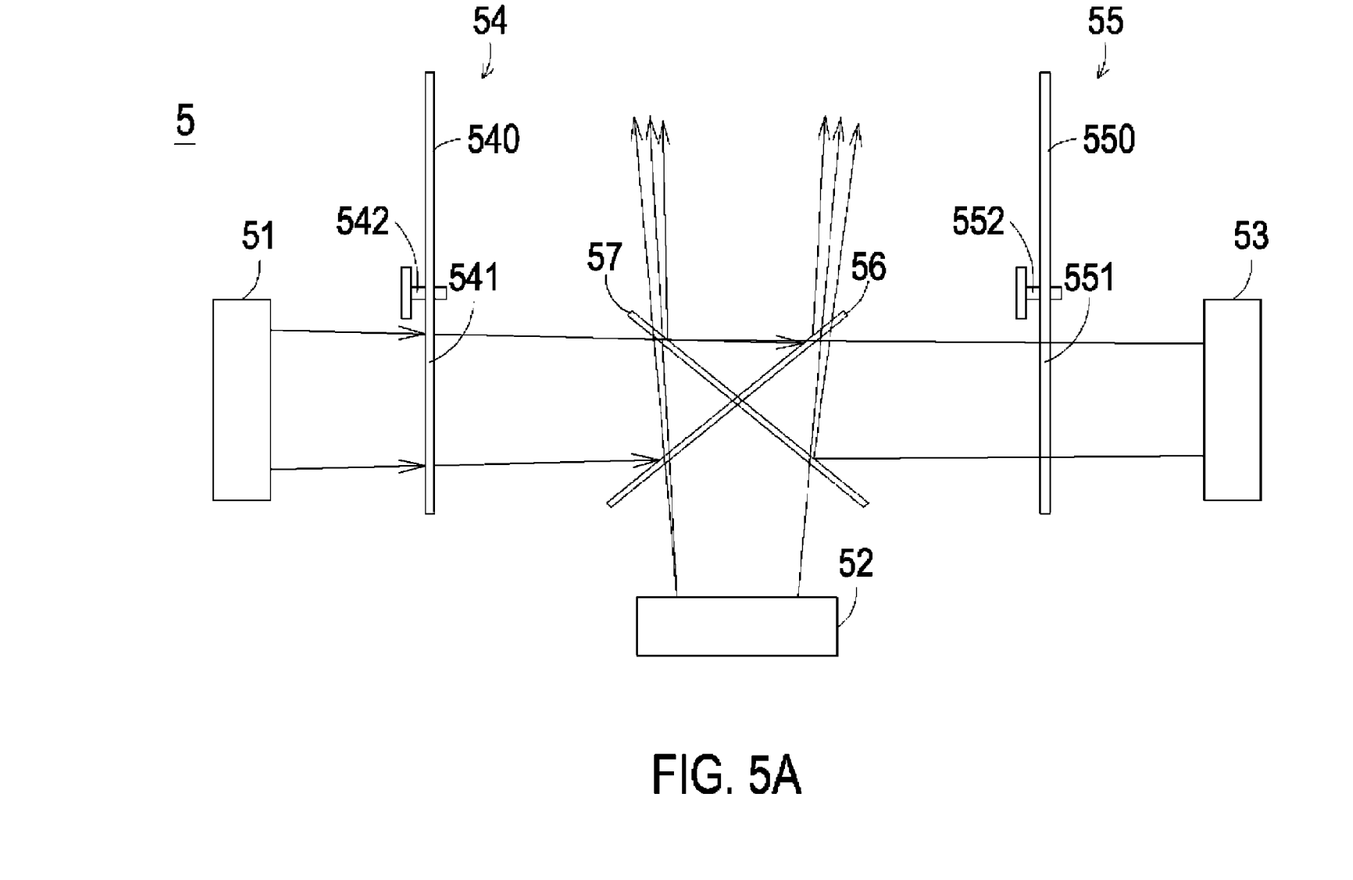
FIG. 5A schematically illustrates the architecture of an illumination system according to another embodiment of the present invention.
Figure 5B:
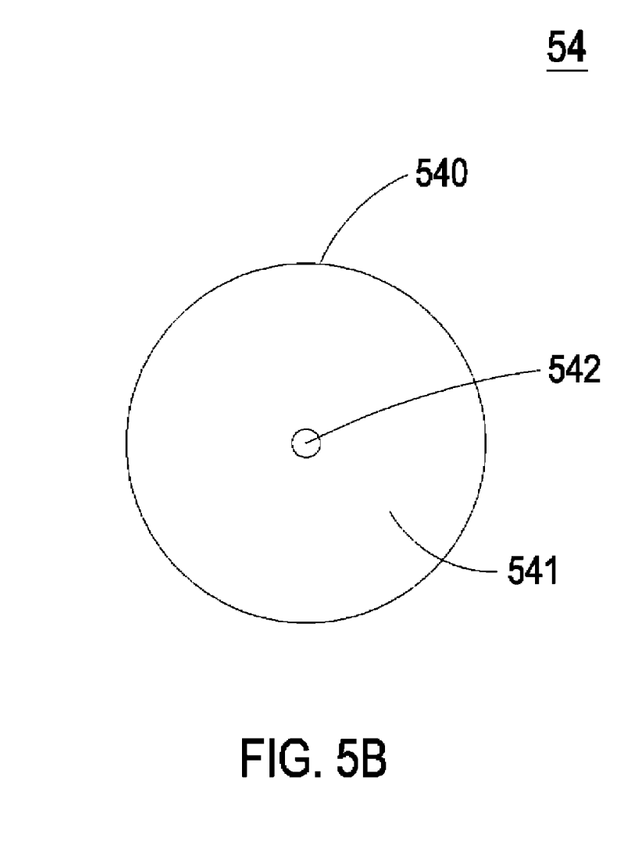
FIGS. 5B and 5C schematically illustrate the configuration of the wavelength conversion device used in the illumination system as shown in FIG. 5A.

FIG. 5A schematically illustrates the architecture of an illumination system according to another embodiment of the present invention. FIGS. 5B and 5C schematically illustrate the configuration of a wavelength conversion device used in the illumination system as shown in FIG. 5A. The illumination system 5 comprises a first solid-state light-emitting element 51, a second solid-state light-emitting element 52, a third solid-state light-emitting element 53, a first wavelength conversion device 54, a wavelength conversion device 55, a first dichroic mirror 56 and a second dichroic mirror 57. The first solid-state light-emitting element 51, the second solid-state light-emitting element 52 and the third solid-state light-emitting element 53 are light emitting diodes or laser diodes, and preferably light emitting diodes. The first solid-state light-emitting element 51, the second solid-state light-emitting element 52 and the third solid-state light-emitting element 53 are configured to emit a first color light in a first waveband region. Preferably, the first color light in the first waveband region is blue light. The first wavelength conversion device 54 is a phosphor wheel and located between the first solid-state light-emitting element 51 and the first dichroic mirror 56. The first wavelength conversion device 54 includes a first wheel body 540 and a first wavelength conversion section 541. The first wheel body 540 includes a first rotation shaft 542. The first wavelength conversion section 541 surrounds the first rotation shaft 542 and contains first phosphor coating. By the first phosphor coating, the first color light from the first solid-state light-emitting element 51 is excited as a second color light in a second waveband region to be outputted. Preferably, the second color light in the second waveband region is green light. In an embodiment, the first wavelength conversion section 541 is the entity of the first wheel body 540 (see FIG. 5B). Alternatively, the first wavelength conversion section 541 is an annular region surrounding the first rotation shaft 542 (not shown). The rotation of the first wavelength conversion device 54 is driven by a motor (not shown) so that the first wavelength conversion device 54 can be driven to rotate around the first rotation shaft 542. Moreover, the first wavelength conversion section 541 of the first wavelength conversion device 54 is disposed at an optical path of the first color light emitted from the first solid-state light-emitting element 51.

Figure 5C:
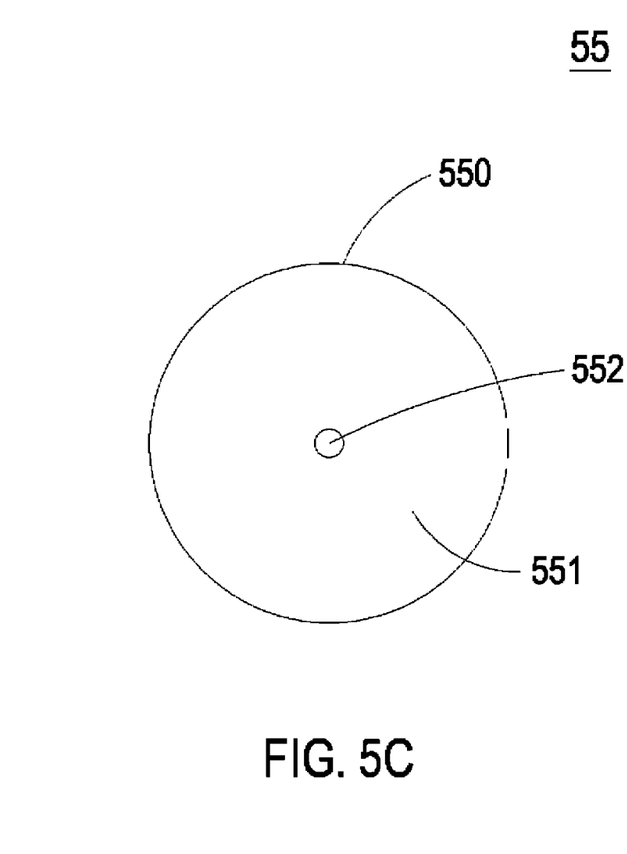

The second wavelength conversion device 55 is a phosphor wheel and located between the third solid-state light-emitting element 53 and the second dichroic mirror 57. The second wavelength conversion device 55 includes a second wheel body 550 and a second wavelength conversion section 551. The second wheel body 550 includes a second rotation shaft 552. The second wavelength conversion section 551 surrounds the second rotation shaft 552 and contains second phosphor coating. By the second phosphor coating, the first color light from the third solid-state light-emitting element 53 is excited as a third color light in a third waveband region to be outputted. Preferably, the third color light in the third waveband region is red light. In an embodiment, the second wavelength conversion section 551 is the entity of the second wheel body 550 (see FIG. 5C). Alternatively, the second wavelength conversion section 551 is an annular region surrounding the second rotation shaft 552 (not shown). The rotation of the second wavelength conversion device 55 is driven by a motor (not shown) so that the second wavelength conversion device 55 can be driven to rotate around the second rotation shaft 552. Moreover, the second wavelength conversion section 551 of the second wavelength conversion device 55 is disposed at an optical path of the first color light emitted from the third solid-state light-emitting element 53.

In this embodiment, the first dichroic mirror 56 and the second dichroic mirror 57 are located between the first solid-state light-emitting element 51, the second solid-state light-emitting element 52 and the third solid-state light-emitting element 53. The blue light and the red light are transmissible through the first dichroic mirror 56, but the green light is permitted to be reflected by the first dichroic mirror 56 and directed to the optical path. The green light and the blue light are transmissible through the second dichroic mirror 57, but the red light is permitted to be reflected by the second dichroic mirror 57 and directed to the optical path.

The first solid-state light-emitting element 51 is used for emitting blue light and directing the blue light to the first wavelength conversion section 541 of the first wavelength conversion device 54. By the first phosphor coating contained in the first wavelength conversion section 541 of the first wavelength conversion device 54, the blue light is excited as green light to be outputted. The green light is then directed to the first dichroic mirror 56 and the second dichroic mirror 57. Moreover, the green light is transmitted through the second dichroic mirror 57, and then reflected by the first dichroic mirror 56 and directed to the optical path. The second solid-state light-emitting element 52 is used for emitting blue light. The blue light from the second solid-state light-emitting element 52 is then directed to the first dichroic mirror 56 and the second dichroic mirror 57. Moreover, the green light is transmitted through the first dichroic mirror 56 and the second dichroic mirror 57 and directed to the optical path. The third solid-state light-emitting element 53 is used for emitting blue light and directing the blue light to the second wavelength conversion section 542 of the second wavelength conversion device 55. By the second phosphor coating contained in the second wavelength conversion section 542 of the second wavelength conversion device 55, the blue light is excited as red light to be outputted. The red light is then directed to the first dichroic mirror 56 and the second dichroic mirror 57. Moreover, the red light is transmitted through the first dichroic mirror 56, and then reflected by the second dichroic mirror 57 and directed to the optical path.

In any time segment, the first solid-state light-emitting element 51, the second solid-state light-emitting element 52 and the third solid-state light-emitting element 53 are simultaneously enabled. The first wavelength conversion device 54 and the second wavelength conversion device 55 are driven to rotate by the motor. Since the first wavelength conversion device 54 has the single first wavelength conversion section 541 for generating the green light, the first wavelength conversion device 54 is only able to excite the received blue light into the green light without outputting any other color of light. In other words, the green light can be generated and outputted in full time segment. Moreover, since the second wavelength conversion device 55 has the single second wavelength conversion section 551 for generating the red light, the second wavelength conversion device 55 is only able to excite the received blue light into the red light without outputting any other color of light. In other words, the blue light can be generated and outputted in full time segment. The combination of the first solid-state light-emitting element 51 and the first wavelength conversion device 54, the second solid-state light-emitting element 52 and the combination of the third solid-state light-emitting element 53 and the second wavelength conversion device 55 can simultaneously and respectively output the green light, the blue light and the red light in full time segment. Since different colors of light may be mixed at the same time spot, the illumination system can be operated in the BrightSync mode. In addition, overall luminous efficiency and brightness of the illumination system and the projector will be enhanced. Moreover, since each of the first wavelength conversion section 541 of the first wavelength conversion device 54 and the second wavelength conversion section 551 of the second wavelength conversion device 55 is the entity of the wheel body 540, 550 or an annular region surrounding the rotation shaft 542, 552, the wheel rotational unbalance problem will be avoided. In addition, the rotations of the wavelength conversion devices 54, 55 can reduce the influence of temperature and consequently remove thermal quenching problem and increase the luminous efficiency of the illumination system.

Figure 6:
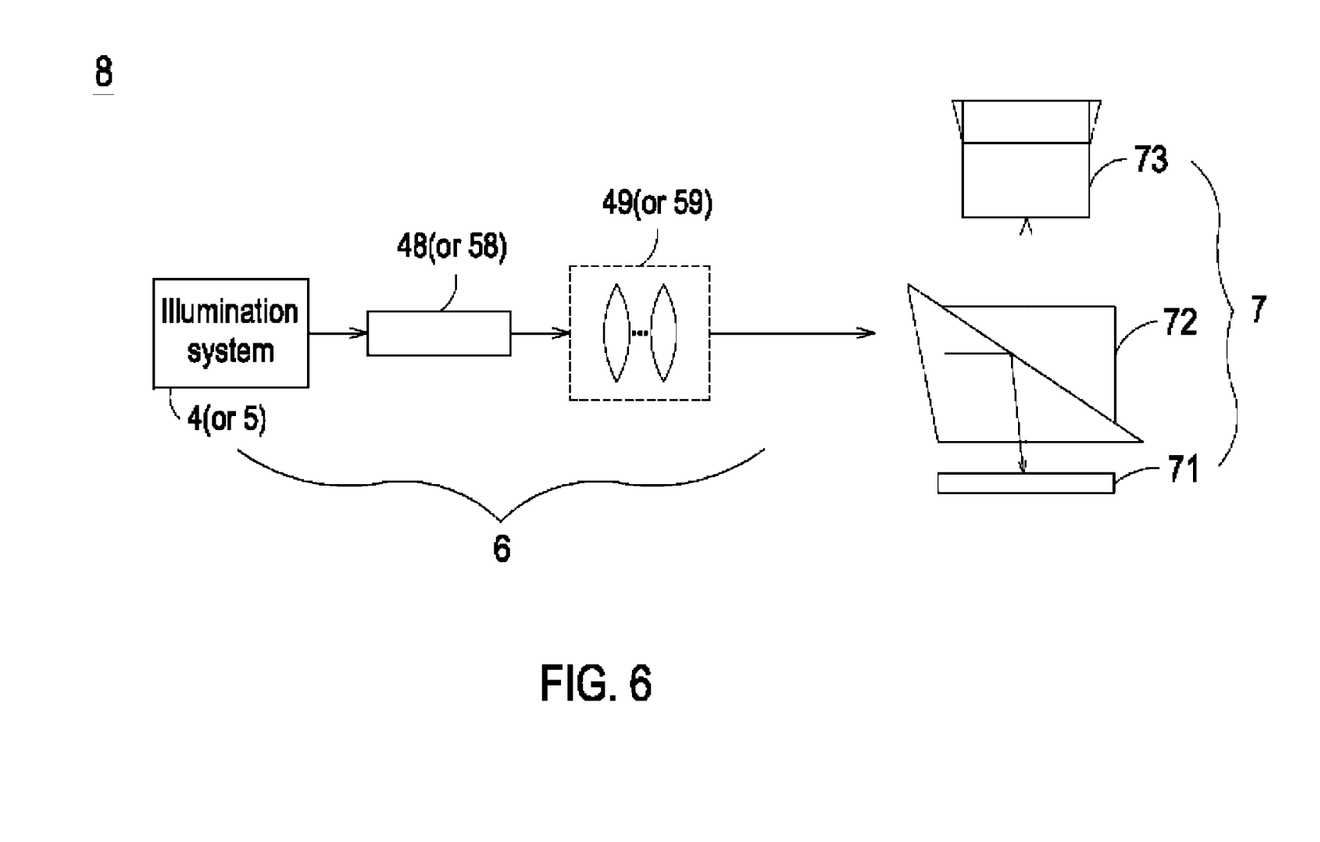
FIG. 6 schematically illustrates the architecture of a projector according to an embodiment of the present invention.

The illumination system 4 or 5 of the present invention can be applied to various projectors such as digital light processing (DLP) projectors or liquid crystal display (LCD) projectors. If the projector 8 is a digital light processing projector, the projector 8 can utilize a single-piece and three-piece digital micromirror device (DMD). FIG. 6 schematically illustrates the architecture of a projector according to an embodiment of the present invention. In this embodiment, the projector 8 is a digital light processing projector utilizing a single-piece digital micromirror device. The projector 8 comprises the illumination system 6 and an imaging system 7. The configurations of the illumination system 6 are similar to the illumination system 4, 5 as shown in FIGS. 4 and 5, and are not redundantly described herein. The blue light, the green light and the red light outputted from the illumination system 6 are converted into an image ray by the imaging system 7. Consequently, the imaging purpose is achieved. The illumination system 6 further comprises a light integration rod 48, 58 and a lens group 49, 59, which are located downstream of the illumination system 4 or 5 for homogenizing the blue light, the green light and the red light. The imaging system 7 includes a prism 71, an imaging element 72 and a projection lens 73. The blue light, the green light and the red light are adjusted by the prism 71 to be projected on the imaging element 72. The imaging element 72 is controlled by a controlling unit (not shown), so that the blue light, the green light and the red light are converted into an image ray. The image ray is then directed to the projection lens 73 and imaged onto a projection screen (not shown). In an embodiment, the imaging element 72 is a single-piece digital micromirror device (DMD) for reflecting the blue light, the green light and the red light to the projection lens 73 in a time-sharing manner. In some embodiments, the projector 8 comprises a three-piece digital micromirror device (DMD). After the blue light, the green light and the red light from the illumination system are split by the projector, the blue light, the green light and the red light are modulated and converted into the image ray by the three-piece digital micromirror device (DMD). The mixed light is directed to the projection lens and then imaged on the projection screen.

Figure 7:
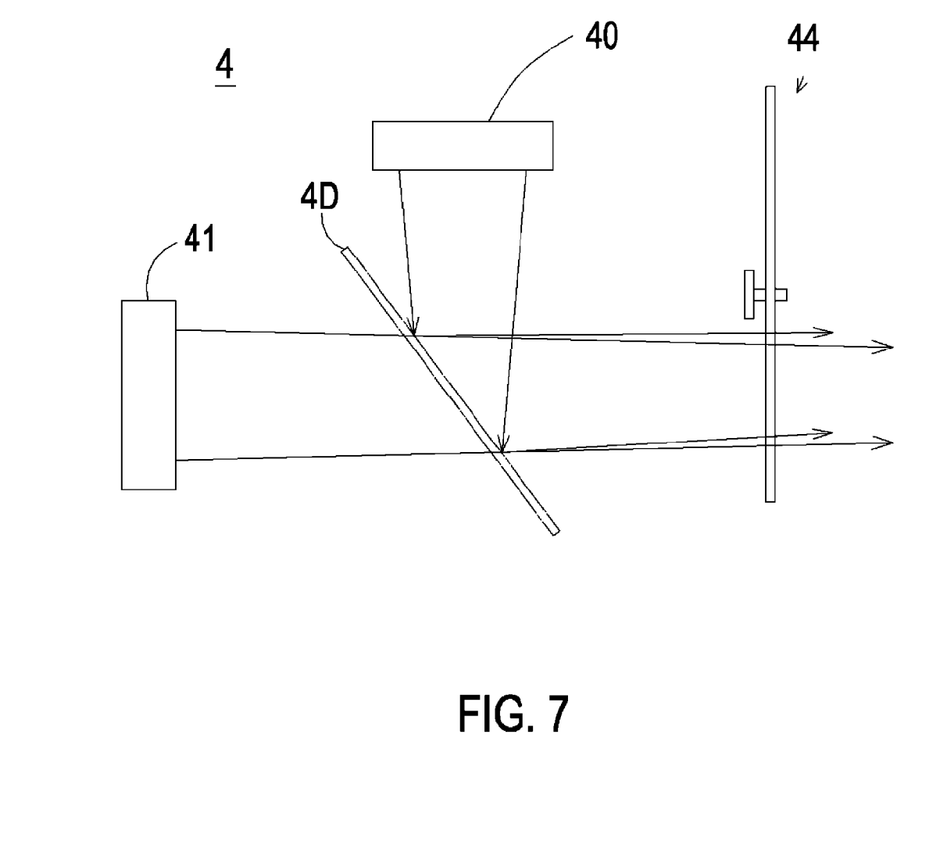
FIG. 7 schematically illustrates a portion of the architecture of an illumination system according to another embodiment of the present invention.

In some embodiments, the illumination system of the present invention can enhance the light intensity of the light source in order to increase the luminance and the illuminance via using a fourth solid-state light-emitting element, which emits a fourth color light in a fourth waveband region. The wavelength of the fourth color light is similar to the wavelength of the first color light, the second color light or the third color light but not identical. FIG. 7 schematically illustrates a portion of the architecture of an illumination system according to another embodiment of the present invention. As shown in FIG. 7, the illumination system 4 of the present invention further comprises a fourth solid-state light-emitting element 40 for emitting a fourth color light in a fourth waveband region to a third dichroic mirror 4D. In this embodiment, the wavelength of the fourth color light is similar to the wavelength of the first color light but not identical (e.g. the wavelength of the first color light is from 360 to 460 nanometers, and the wavelength of the fourth color light is from 420 to 500 nanometers). In other words, the range of the wavelength of the first color light and the range of the wavelength of the fourth color light are at least partially overlapped, but not limited thereto. The third dichroic minor 4D is located between the first solid-state light-emitting element 41, the fourth solid-state light-emitting element 40 and the wavelength conversion device 44. The first color light is transmissible through the third dichroic mirror 4D, but the fourth color light is permitted to be reflected by the third dichroic minor 4D and directed to an optical path. Because the first color light and the fourth color light have similar wavelengths, the light directed by the third dichroic minor 4D enhances the light intensity of the color light in range of the wavelength of the first color light. For example, the light intensity of the blue light is enhanced, so that the luminance and the illuminance of the blue light are increased. As the above description, the concept for enhancing the light intensity of a color light can be used for enhancing the color light in range of the wavelength of the second color light or the third color light. The architectures/configurations of the illumination system are similar to the illumination system 4 as shown in FIG. 7, and are not redundantly described herein.

From the above description, the present invention provides an illumination system and a projector using the illumination system. By a special phosphor wheel and the solid-state light-emitting elements, the wheel rotational unbalance problem can be avoided. Since different colors of light may be mixed at the same time spot, the illumination system can be operated in the BrightSync mode. In addition, the overall luminous efficiency and brightness of the illumination system and the projector will be enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illumination system, comprising:
    a first solid-state light-emitting element for emitting a first color light in a first waveband region;
    a wavelength conversion device comprising a wheel body and a wavelength conversion section, wherein said wheel body comprises a rotation shaft, and said wavelength conversion section surrounds said rotation shaft and contains a phosphor coating, wherein by said phosphor coating, said first color light from said first solid-state light-emitting element is excited as a second color light in a second waveband region to be outputted to a surface to be illuminated;
    a second solid-state light-emitting element for emitting said first color light, wherein said first color light emitted by said second solid-state light-emitting element is directly outputted to said surface to be illuminated without undergoing any wavelength conversion; and
    a third solid-state light-emitting element for emitting a third color light in a third waveband region.

2. The illumination system according to claim 1 wherein said first color light in said first waveband region is blue light, said second color light in said second waveband region is green light, and said third color light in said third waveband region is red light.

3. The illumination system according to claim 1 wherein said wavelength conversion device is a phosphor wheel.

4. The illumination system according to claim 1 wherein said first solid-state light-emitting element, said second solid-state light-emitting element and said third solid-state light-emitting element are light emitting diodes or laser diodes.

5. The illumination system according to claim 1 wherein said wavelength conversion section is an entity of said wheel body or an annular region surrounding said rotation shaft.

6. The illumination system according to claim 1 further comprising a first dichroic minor and a second dichroic minor, wherein said first dichroic mirror and said second dichroic minor are located between said first solid-state light-emitting element, said second solid-state light-emitting element and said third solid-state light-emitting element.

7. The illumination system according to claim 6 wherein said wavelength conversion device is located between said first solid-state light-emitting element and said first dichroic minor.

8. The illumination system according to claim 6 wherein said first color light and said third color light are transmissible through said first dichroic mirror, but said second color light is permitted to be reflected by said first dichroic mirror and directed to an optical path, wherein said second color light and said first color light are transmissible through said second dichroic mirror, but said third color light is permitted to be reflected by said second dichroic minor and directed to said optical path.

9. The illumination system according to claim 1 wherein said wavelength conversion device is driven to rotate around said rotation shaft by a motor, and said wavelength conversion section of said wavelength conversion device is disposed at an optical path of first color light emitted from said first solid-state light-emitting element.

10. The illumination system according to claim 9 wherein in a time segment, said first solid-state light-emitting element, said second solid-state light-emitting element and said third solid-state light-emitting element are simultaneously enabled, wherein said second color light is outputted from said wavelength conversion device in full time segment, and said first color light, said second color light and said third color light are simultaneously outputted from said illumination system.

11. An illumination system, comprising:
    a first solid-state light-emitting element for emitting a first color light in a first waveband region;
    a first wavelength conversion device comprising a first wheel body and a first wavelength conversion section, wherein said first wheel body comprises a first rotation shaft, and said first wavelength conversion section surrounds said first rotation shaft and contains a first phosphor coating, wherein by said first phosphor coating, said first color light from said first solid-state light-emitting element is excited as a second color light in a second waveband region to be outputted to a surface to be illuminated;
    a second solid-state light-emitting element for emitting said first color light, wherein said first color light emitted by said second solid-state light-emitting element is directly outputted to said surface to be illuminated without undergoing any wavelength conversion;
    a third solid-state light-emitting element for emitting said first color light; and
    a second wavelength conversion device comprising a second wheel body and a second wavelength conversion section, wherein said second wheel body comprises a second rotation shaft, and said second wavelength conversion section surrounds said second rotation shaft and contains a second phosphor coating, wherein by said second phosphor coating, said first color light from said third solid-state light-emitting element is excited as a third color light in a third waveband region to be outputted.

12. The illumination system according to claim 11 wherein said first color light in said first waveband region is blue light, said second color light in said second waveband region is green light, and said third color light in said third waveband region is red light.

13. The illumination system according to claim 11 wherein said first wavelength conversion device and said second wavelength conversion device are phosphor wheels.

14. The illumination system according to claim 11 wherein said first wavelength conversion section is an entity of said first wheel body an annular region surrounding said first rotation shaft, and said second wavelength conversion section is an entity of said second wheel body or an annular region surrounding said second rotation shaft.

15. The illumination system according to claim 11 further comprising a first dichroic minor and a second dichroic minor, wherein said first dichroic mirror and said second dichroic minor are located between said first solid-state light-emitting element, said second solid-state light-emitting element and said third solid-state light-emitting element; and wherein said first wavelength conversion device is located between said first solid-state light-emitting element and said first dichroic minor, and said second wavelength conversion device is located between said third solid-state light-emitting element and said second dichroic minor.

16. The illumination system according to claim 15 wherein said first color light and said third color light are transmissible through said first dichroic mirror, but said second color light is permitted to be reflected by said first dichroic mirror and directed to an optical path, wherein said second color light and said first color light are transmissible through said second dichroic mirror, but said third color light is permitted to be reflected by said second dichroic minor and directed to said optical path.

17. The illumination system according to claim 16 wherein in a time segment, said first solid-state light-emitting element, said second solid-state light-emitting element and said third solid-state light-emitting element are simultaneously enabled, wherein said second color light is outputted from said first wavelength conversion device in full time segment, said third color light is outputted from said second wavelength conversion device in full time segment, and said second color light, said first color light and said third color light are simultaneously outputted from said illumination system.

18. A projector, comprising:
an illumination system comprising:
a first solid-state light-emitting element for emitting a first color light in a first waveband region;
a wavelength conversion device comprising wheel body and a wavelength conversion section, wherein said wheel body comprises a rotation shaft, and said wavelength conversion section surrounds said rotation shaft and contains a phosphor coating, wherein by said phosphor coating, said first color light from said first solid-state light-emitting element is excited as a second color light in a second waveband region to be outputted to a surface to be illuminated;
a second solid-state light-emitting element for emitting said first color light, wherein said first color light emitted by said second solid-state light-emitting element is directly outputted to said surface to be illuminated without undergoing any wavelength conversion; and
a third solid-state light-emitting element for emitting a third color light in a third waveband region; and
an imaging system, wherein said first color light, said second color light and said third color light from said illumination system are converted into an image ray by said imaging system.

19. The projector according to claim 18 wherein said illumination system further comprises a light integration rod and a lens group configured to homogenizing said first color light, said second color light and said third color light.

20. The projector according to claim 19 wherein said imaging system comprises:
a prism for adjusting said first color light, said second color light and said third color light;
an imaging element, wherein said first color light, said second color light and said third color light from said prism is converted into said image ray by said imaging element; and
a projection lens for projecting said image ray, so that said image ray is imaged on a projection screen.

21. The projector according to claim 20 wherein said imaging element is a digital micromirror device (dmd).

22. A projector, comprising:
an illumination system comprising:
a first solid-state light-emitting element for emitting a first color light in a first waveband region;
a first wavelength conversion device comprising a first wheel body and a first wavelength conversion section, wherein said first wheel body comprises a first rotation shaft, and said first wavelength conversion section surrounds said first rotation shaft and contains a first phosphor coating, wherein by said first phosphor coating, said first color light from said first solid-state light-emitting element is excited as a second color light in a second waveband region to be outputted to a surface to be illuminated;
a second solid-state light-emitting element for emitting said first color light, wherein said first color light emitted by said second solid-state light-emitting element is directly outputted to said surface to be illuminated without undergoing any wavelength conversion;
a third solid-state light-emitting element for emitting said first color light; and
a second wavelength conversion device comprising a second wheel body and a second wavelength conversion section, wherein said second wheel body comprises a second rotation shaft, and said second wavelength conversion section surrounds said second rotation shaft and contains a second phosphor coating, wherein by said second phosphor coating, said first color light from said third solid-state light-emitting element is excited as a third color light in a third waveband region to be outputted; and
an imaging system, wherein said first color light, said second color light and said third color light from said illumination system are converted into an image ray by said imaging system.

23. An illumination system, comprising:
a first solid-state light-emitting element for emitting a first color light in a first waveband region;
a wavelength conversion device comprising a wheel body and a wavelength conversion section, wherein said wheel body comprises a rotation shaft, and said wavelength conversion section surrounds said rotation shaft and contains a phosphor coating, wherein by said phosphor coating, said first color light from said first solid-state light-emitting element is excited as a second color light in a second waveband region to be outputted;
a second solid-state light-emitting element for emitting said first color light;
a third solid-state light-emitting element for emitting a third color light in a third waveband region;

a fourth solid-state light-emitting element for emitting a fourth color light in a fourth waveband region; and a dichroic mirror located between said first solid-state light-emitting element, said fourth solid-state light-emitting element and said wavelength conversion device, wherein said first color light is transmissible through said dichroic minor, but said fourth color light is permitted to be reflected by said dichroic minor and directed to an optical path, so that the light intensity of the color light in range of the wavelength of said first color light is enhanced.

24. The illumination system according to claim 23 wherein the range of the wavelength of said first color light and the range of the wavelength of said fourth color light are at least partially overlapped.

* * * * *